United States Patent
Pai-Paranjape et al.

(10) Patent No.: US 6,673,410 B2
(45) Date of Patent: *Jan. 6, 2004

(54) COLORED OPTICAL DISCS AND METHODS FOR MAKING THE SAME

(75) Inventors: Vandita Pai-Paranjape, Evansville, NY (US); Steven R. Peak, Evansville, IN (US); Philippe Schottland, Evansville, IN (US); Verghese Thomas, Evansville, IN (US); Sharon S. Weis, Evansville, IN (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/063,906

(22) Filed: May 22, 2002

(65) Prior Publication Data

US 2003/0148059 A1 Aug. 7, 2003

Related U.S. Application Data

(63) Continuation-in-part of application No. 09/683,346, filed on Dec. 17, 2001, now Pat. No. 6,475,589.

(51) Int. Cl.[7] .................................................. B32B 3/02
(52) U.S. Cl. ................. 428/64.1; 428/64.8; 430/270.11
(58) Field of Search .............................. 428/64.1, 64.4, 428/64.8, 913; 430/270.11, 495.1, 945; 369/283, 288

(56) References Cited

U.S. PATENT DOCUMENTS

| | | |
|---|---|---|
| 2,139,155 A | 12/1938 | Gernandt |
| 3,152,098 A | 10/1964 | Snedeker |
| 3,423,483 A | 1/1969 | Anyos et al. |
| 3,507,951 A | 4/1970 | Morecroft et al. |
| 3,635,895 A | 1/1972 | Kramer |
| 3,673,146 A | 6/1972 | Factor |
| 3,689,768 A | 9/1972 | Sato et al. |

(List continued on next page.)

FOREIGN PATENT DOCUMENTS

| | | |
|---|---|---|
| EP | 0004268 | 6/1981 |
| EP | 0 113 870 A1 | 7/1984 |
| EP | 0101667 | 10/1984 |
| EP | 0212411 B1 | 3/1987 |
| EP | 0215322 B1 | 3/1987 |
| EP | 0 311 512 A2 | 4/1989 |
| EP | 0408271 A2 | 1/1991 |

(List continued on next page.)

OTHER PUBLICATIONS

International Search Report, International Application No. PCT/US02/33503, International Filing Date Oct. 16, 2002, Abstract Only (1 page).

Primary Examiner—Elizabeth Mulvaney

(57) ABSTRACT

Embodiments of optical discs and methods for making the same are disclosed. In one embodiment, the optical disc comprises: at least two plastic substrates comprising a bonding layer and a data layer disposed therebetween, wherein at least one of the substrates is a read side substrate comprising greater than or equal to about 0.01 wt % colorant, based upon the total weight of the read side substrate, and wherein the read side substrate has a UV Bonding Index of greater than or equal to about 0.5. One method for making the optical disc comprises: forming a first plastic substrate comprising greater than or equal to about 0.01 wt % colorant, based upon the total weight of the first plastic substrate, wherein a UV Bonding Index of the first plastic substrate is controlled to be greater than or equal to about 0.5, disposing a data layer between the first plastic substrate and a second substrate, bonding the first plastic substrate to the second plastic substrate with a bonding layer, and curing the bonding layer.

39 Claims, 5 Drawing Sheets

U.S. PATENT DOCUMENTS

| | | |
|---|---|---|
| 4,001,184 A | 1/1977 | Scott |
| 4,023,185 A | 5/1977 | Bloom et al. |
| 4,049,614 A | 9/1977 | Baron et al. |
| 4,092,288 A | 5/1978 | Calkins et al. |
| 4,097,895 A | 6/1978 | Spong |
| 4,101,907 A | 7/1978 | Bell et al. |
| 4,143,026 A | 3/1979 | Panek et al. |
| 4,190,843 A | 2/1980 | Spong |
| 4,217,438 A | 8/1980 | Brunelle et al. |
| 4,218,689 A | 8/1980 | Bloom et al. |
| 4,219,826 A | 8/1980 | Bloom et al. |
| 4,241,355 A | 12/1980 | Bloom et al. |
| 4,242,689 A | 12/1980 | Bloom et al. |
| 4,251,425 A | 2/1981 | Ohara et al. |
| 4,271,211 A | 6/1981 | Knepper |
| 4,284,411 A | 8/1981 | Neeff et al. |
| 4,286,957 A | 9/1981 | Le Naour-Sene |
| 4,315,269 A | 2/1982 | Bloom et al. |
| 4,332,587 A | 6/1982 | Kressner et al. |
| 4,336,545 A | 6/1982 | Howe et al. |
| 4,363,844 A | 12/1982 | Lewis et al. |
| 4,377,389 A | 3/1983 | Haddad et al. |
| 4,405,706 A | 9/1983 | Takahashi et al. |
| 4,444,714 A | 4/1984 | Martensen |
| 4,464,487 A | 8/1984 | Thomas et al. |
| 4,477,608 A | 10/1984 | Babler et al. |
| 4,501,876 A | 2/1985 | Zahr |
| 4,521,483 A | 6/1985 | Sasaki et al. |
| 4,542,957 A | 9/1985 | Ishiwari et al. |
| 4,640,690 A | 2/1987 | Baumgartner et al. |
| 4,650,823 A | 3/1987 | Krishnan et al. |
| 4,689,086 A | 8/1987 | Naumann et al. |
| 4,709,363 A | 11/1987 | Dirks et al. |
| 4,719,615 A | 1/1988 | Feyrer et al. |
| 4,722,595 A | 2/1988 | Siol |
| 4,732,570 A | 3/1988 | Baumgartner et al. |
| 4,746,711 A | 5/1988 | Serini et al. |
| 4,812,141 A | 3/1989 | Baumgartner et al. |
| 4,812,142 A | 3/1989 | Brodmann |
| 4,889,756 A | 12/1989 | Barzynski et al. |
| 4,891,800 A | 1/1990 | Sugaya |
| 4,919,514 A | 4/1990 | Ebert et al. |
| 4,948,715 A | 8/1990 | Hulme-Lowe et al. |
| 4,983,648 A | 1/1991 | Laughner et al. |
| 4,998,239 A | 3/1991 | Strandjord et al. |
| 5,018,828 A | 5/1991 | Ohdaira et al. |
| 5,051,977 A | 9/1991 | Goldberg |
| 5,116,547 A | 5/1992 | Tsukahara et al. |
| 5,190,800 A | 3/1993 | Yamada et al. |
| 5,240,464 A | 8/1993 | Kluger et al. |
| 5,307,229 A | 4/1994 | Sata |
| 5,447,767 A | 9/1995 | Tanabe et al. ............. 428/64.4 |
| 5,453,100 A | 9/1995 | Sieloff |
| 5,491,029 A | 2/1996 | Evans et al. |
| 5,534,602 A | 7/1996 | Lupinski et al. |
| 5,640,382 A | 6/1997 | Florczak et al. |
| 5,648,197 A | 7/1997 | Kuroda |
| 5,671,205 A | 9/1997 | Ledieu |
| 5,688,447 A | 11/1997 | Hong |
| 5,800,573 A | 9/1998 | Michaelis et al. |
| 5,804,124 A | 9/1998 | Sata |
| 5,820,961 A | 10/1998 | Maruyama et al. |
| 5,840,395 A | 11/1998 | Sawada et al. |
| 5,894,069 A | 4/1999 | Wen et al. |
| 5,958,087 A | 9/1999 | Liao et al. |
| 6,022,944 A | 2/2000 | Weaver et al. |
| 6,045,888 A | 4/2000 | Chan et al. |
| 6,099,930 A | 8/2000 | Cyr et al. |
| RE36,902 E | 10/2000 | Eckel et al. |
| 6,183,830 B1 | 2/2001 | Okamoto et al. |
| 6,214,433 B1 | 4/2001 | Tronche et al. |
| 6,219,329 B1 | 4/2001 | Tanaka et al. |
| 6,226,109 B1 | 5/2001 | Tompkin et al. |
| 6,245,118 B1 | 6/2001 | Shakhnovich |
| 6,280,808 B1 | 8/2001 | Fields et al. |
| 6,475,588 B1 | 11/2002 | Schottland et al. ........ 428/64.1 |
| 6,475,589 B1 * | 11/2002 | Pai-Paranjape ............ 428/64.1 |
| 2002/0072559 A1 | 6/2002 | Cradic et al. |

FOREIGN PATENT DOCUMENTS

| | | |
|---|---|---|
| EP | 0 438 225 B1 | 10/1996 |
| EP | 0980067 A2 | 2/2000 |
| EP | 1069556 A1 | 1/2001 |
| EP | 1236758 A1 | 9/2002 |
| GB | 963779 | 7/1964 |
| GB | 1195078 | 6/1970 |
| GB | 1502237 | 2/1978 |
| GB | 2005457 A | 4/1979 |
| GB | 1577548 | 10/1980 |
| GB | 1595426 | 8/1981 |
| JP | 53070730 | 6/1978 |
| JP | 55123646 | 9/1980 |
| JP | 55160051 | 12/1980 |
| JP | 56031085 | 3/1981 |
| JP | 56070053 | 6/1981 |
| JP | 56070054 | 6/1981 |
| JP | 57150152 | 9/1982 |
| JP | 57151644 | 9/1982 |
| JP | 57192458 | 11/1982 |
| JP | 558174438 | 10/1983 |
| JP | 58218055 | 12/1983 |
| JP | 59045195 | 3/1984 |
| JP | 59228712 | 12/1984 |
| JP | 60194720 | 12/1985 |
| JP | 6145437 | 5/1986 |
| JP | 61129753 | 6/1986 |
| JP | 61236891 | 10/1986 |
| JP | 62168119 | 7/1987 |
| JP | 6220559 | 9/1987 |
| JP | 6341086 | 10/1987 |
| JP | 62179797 | 11/1987 |
| JP | 6341099 | 12/1987 |
| JP | 6341102 | 12/1987 |
| JP | 63195838 | 8/1988 |
| JP | 02033742 | 2/1990 |
| JP | 06060422 | 3/1994 |
| JP | 07057300 | 3/1995 |
| JP | 7262606 | 10/1995 |
| JP | 7111785 | 11/1995 |
| JP | 8279188 | 10/1996 |
| JP | 9288847 | 11/1997 |
| JP | 9180261 | 10/1998 |
| JP | 11025518 | 1/1999 |
| WO | WO 80/00708 | 4/1980 |
| WO | WO 84/02794 | 7/1984 |
| WO | WO 84/02795 | 7/1984 |
| WO | WO 99/18571 | 4/1999 |
| WO | WO 99/24527 | 5/1999 |
| WO | WO 01/83595 A1 | 11/2001 |
| WO | WO 03/013214 | 2/2003 |

* cited by examiner

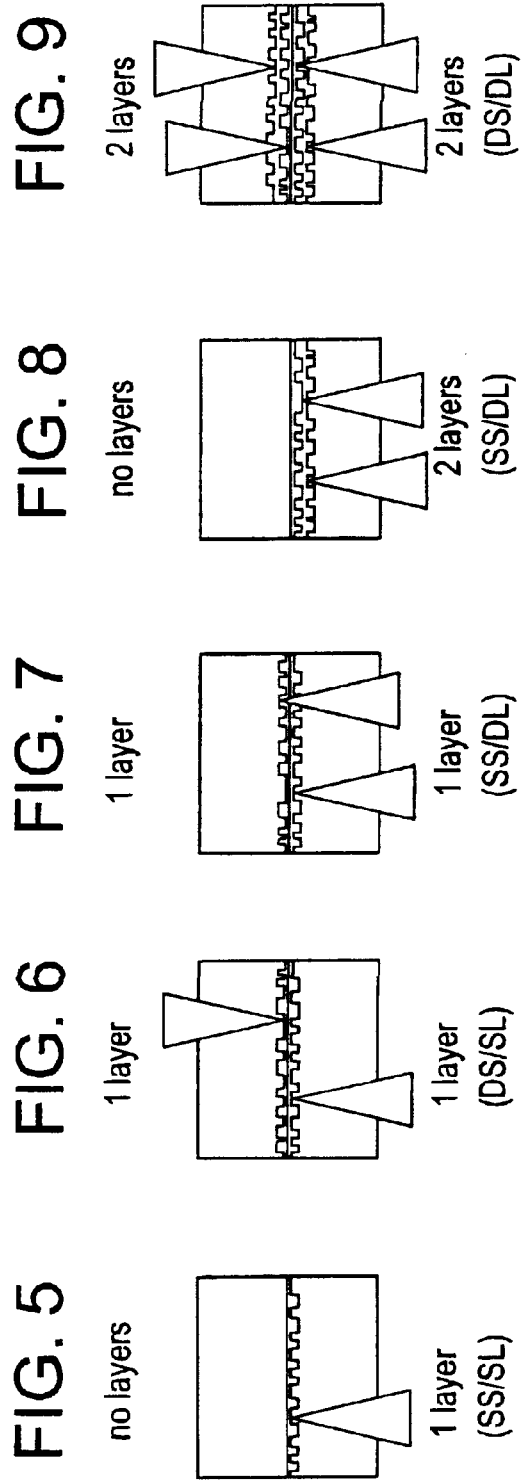

COLORED OPTICAL DISCS AND METHODS FOR MAKING THE SAME

CROSS REFERENCE TO RELATED APPLICATIONS

This application is a continuation-in-part application of U.S. patent application Ser. No. 09/683,346 filed on Dec. 17, 2001, now U.S. Pat. No. 6,475,589 issued Nov. 5, 2002, which is incorporated herein by reference.

BACKGROUND OF INVENTION

This disclosure relates to a data storage media, and especially relates to a colored data storage media.

Digital Versatile Disks (or DVDs) are slowly but surely taking over compact disks (CDs). These formats provide significantly more storage capacity than CDs thus allowing the recording of up to 8 hours of video/audio content with high digital quality. The number of DVDs sold on the market will likely exceed 1 billion units globally in 2001 and is expected to reach about 4 billion by 2004.

To achieve the high storage density in a disk that has the same overall dimensions as a CD, the disk construction has been changed. The most fundamental and visible difference is that a DVD is no longer made of a single 1.2 mm thick plastic substrate but of two 0.6 mm halves that are bonded together ("DVD Demystified:" by Jim Taylor, ed. McGraw Hill, 1998). In addition, the reading laser wavelength has changed from 780 nanometers (nm) in CDs, which is located in the near infrared part of the spectrum, to 635 or 650 nm for DVDs that is located in the visible spectrum. Depending on the type of DVD (DVD-5, DVD-9, DVD-10, DVD-14, DVD-18, DVD-R, DVD-RW, etc.), the construction can vary substantially, going from a single side/single layer (DVD-5) to double side/double layer (DVD-18), not to mention the recordable formats such as DVD-R and DVD-RW. The tight specifications (European Association for Standardizing Information and Communication Systems ("ECMA") Specifications #267 for 1.20 mm DVD-Read only disk) imposed by the Optical Media consortium, combined with the fact that the laser wavelength is located in the visible spectrum makes DVD manufacturing a challenge.

The optical properties of the substrate are not the only requirements for DVDs. For example, the size of the pits is much smaller in a DVD, which implies that a DVD is more sensitive to resin quality (impurities) than a CD. Due to their thinner gage (0.6 mm instead of 1.2 mm), DVDs are also more challenging than CDs in terms of molding. In fact, the rheology (flow characteristics) of the resin is important and tightly controlled. Additionally, inconsistencies in the thickness of the disk body are also a source of defects in optical disks. A DVD is much more sensitive to the presence of such defects because it is not only thinner and read in the visible spectrum, but it is also read at a higher rotational/scanning speed than a regular CD. The most advanced DVD formats that are multi-layered (as for example DVD-9, DVD-14 and DVD-18) represent the highest degree both a fully reflective and a semi-reflective layer associated with 2 layers of pits (e.g., patterning which forms geographic locators). Single layered DVDs, i.e. DVD-5 and DVD-10, do not have the semi-reflective layer and contain only one layer of pits. As a result of the differences in the disk construction, reflectivity requirements are very different between single layered and multi-layered disks.

To date, all the pre-recorded or recordable multi-layered DVDs available on the market are made with colorless resin. The only aesthetic difference between DVDs comes from the metallization (i.e., the data layer). For example a gold disk is obtained when gold is used, and similarly, a bright silver look is obtained with silver, silver alloy or aluminum.

SUMMARY OF INVENTION

Disclosed herein are optical discs and methods for making the same. In one embodiment, the optical discs comprise: at least two plastic substrates comprising a bonding layer and a data layer disposed therebetween, wherein at least one of the substrates is a read side substrate comprising greater than or equal to about 0.01 wt % colorant, based upon the total weight of the read side substrate, and wherein the read side substrate has a UV Bonding Index of greater than or equal to about 0.5.

One method for making the optical disc comprises: forming a first plastic substrate comprising greater than or equal to about 0.01 wt % colorant, based upon the total weight of the first plastic substrate, wherein a UV Bonding Index of the first plastic substrate is controlled to be greater than or equal to about 0.5, disposing a data layer between the first plastic substrate and a second substrate, bonding the first plastic substrate to the second plastic substrate with a bonding layer, and curing the bonding layer.

These and other features will be apparent from the following brief description of the drawings, detailed description, and attached drawings.

BRIEF DESCRIPTION OF DRAWINGS

Referring now to the following Figures, in which:

FIG. 5 is a schematic of a DVD construction having a single reflective data layer and a single laser;

FIG. 6 is a schematic of a DVD construction having two reflective data layers, both disposed on opposite sides of the center of the substrate, and each readable from different sides of the substrate;

FIG. 7 is a schematic of a DVD construction having two reflective data layers, both disposed on opposite sides of the center of the substrate, and both readable from the same side of the substrate;

FIG. 8 is a schematic of a DVD construction having two reflective data layers, both disposed on the same side of the center of the substrate, and both readable from the same side of the substrate;

FIG. 9 is a schematic of a DVD construction having four reflective data layers, two disposed on each side of the center of the substrate, and two readable from each side of the substrate;

DETAILED DESCRIPTION

Figure 1:
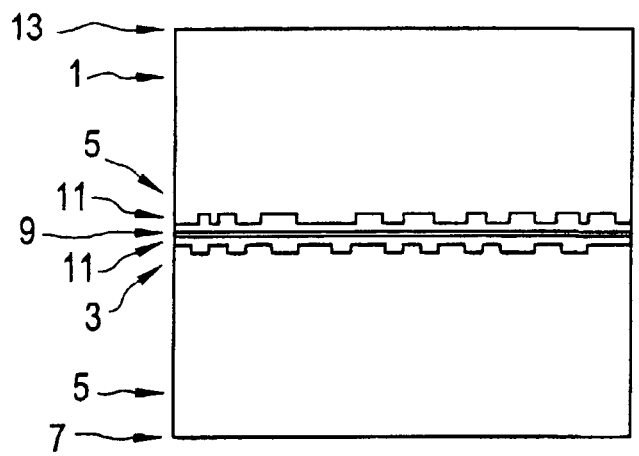
FIG. 1 is a schematic representation of a DVD 9 construction.

Currently, DVDs found on the market are made using clear (colorless) resin. The clear disks show good optical/electrical properties (reflectivity, jitter, parity inner (PI) errors, birefringence, etc.) as well as good mechanical properties (radial/tangential/vertical tilt), even after aging at 80° C. at 85% relative humidity (RH) for 4 days. In an attempt to produce colored disks, it was discovered that the bonding capability of some colored formulations was poor, as was reflected in the mechanical properties of the disk; i.e., radial/tangential/vertical tilt. In fact, some colored disks were completely out of specifications (e.g., a radial tilt greater than ±800 millidegrees (mdeg)), and therefore could not be considered as a functional disk as defined by the industry standard specifications (European Association for Standardizing Information and Communication Systems ("ECMA") Specifications #267 for 1.2 millimeter (mm) DVD-Read only discs).

The bonding problems, which can be seen in any type of disc employing color and an adhesive, for example, any type of DVD format (e.g., single layered (such as DVD-5 and DVD-10), multi-layered (such as DVD-9, DVD-14, DVD-18), and the like, corresponds to an insufficient curing of the bonding layer (otherwise known as the lacquer or adhesive) used to bond the two plastic substrates of the DVD. The insufficient curing of the bonding layer leads to tilt defects or, in the worst case, to a total adhesion failure where the two substrates do not stick to each other.

The process of bonding the plastic substrates of the DVD discs can be accomplished with UV light (e.g., in the about 330 to about 410 nanometer (nm) range) that irradiates the adhesive (e.g., photocurable bonding layer). The issue with the colored discs is that the colored substrates exhibit some UV absorption with the amount of absorption dependent on the level of loading and chemical nature of the colorant. The bonding problems occur when the amount of UV light transmission through the plastic substrate is low (for example, less than about 1% of the UV light that would transmit through a clear substrate).

In order to ensure proper bonding of the substrate layers in the colored discs, a threshold energy is transmitted through the colored substrate. The threshold energy is defined by,the total spectral energy (watts) transmitted in the about 330 to about 410 nm range. It should be emphasized that the threshold energy is herein defined with the same cure time as for a clear substrate. It is understood that a lower threshold energy could be employed with a longer cure time which could increase the efficiency of light absorption by the bonding layer and consequently improve bonding. Typical curing time is less than about 3 seconds, with less than or equal to about 2 seconds preferred. However, the cycle time would be increased considerably which would negatively impact disc production rate and hence is not the method of choice.

The threshold energy can be quantified in terms of a parameter known as the "UV Bonding Index" which is a function of the absorption spectrum of the colored substrate as well as the spectral distribution of the irradiating source. To obtain the UV Bonding Index, the product of the spectral energy output of the irradiating source and percentage transmission through the colored plastic substrate is first calculated as a function of wavelength over the entire UV-Visible spectrum. Integration of this curve over the wavelength range 330 nm to the bonding layer cutoff (i.e., to the point where the bonding layer no longer absorbs the light) provides a value for total energy transmitted through the colored substrate in that spectral range. The ratio of the total energy passing through a colored substrate to that of the energy passing through a clear substrate (calculated by the above procedure) gives a value for the UV Bonding Index. Although a UV Bonding Index of greater than or equal to about 0.5 can be employed, a UV Bonding Index of greater than or equal to about 1.0 is preferred, greater than or equal to about 2 is more preferred, greater than or equal to about 4.0 is even more preferred. It has been discovered that UV Bonding Indices of less than or equal to about 70, less than or equal to about 60, less than or equal to about 50, less than or equal to about 40, less than or equal to about 30, less than or equal to about 20, less than or equal to about 10, and even less than or equal to about 5 can be employed.

The UV Bonding Index can be calculated for any lamp. Some possible lamps include the Type 'D' bulb from Fusion UV Systems, Type FQ20007 bulb in the Flash Pulse UV curing system (Marubeni/Origin DVD Bonder), DVD Edge Cure lamp (M2 Corp.), RC742 lamps from Xenon Corp., and the like. Similarly, the UV Bonding Index can be calculated for any bonding layer that absorbs light in at least a portion of the desired spectrum. Some possible bonding layers include Daicure Series SD-693, SD-694 and SD698 (Dainippon Ink & Chemicals, Inc.), Quretech DVD065 and DVD106, Kayarad MPZ-62, and the like, as well as combinations comprising at least one of the foregoing bonding layers.

Referring to FIG. 1, a digital versatile disk (DVD) comprises two bonded plastic substrates (or resin layers) 1, each typically having a thickness less than or equal to about 1.0 millimeter (mm), with a thickness of less than or equal to about 0.7 mm preferred. A thickness of greater than or equal to about 0.4 mm is also preferred. At least one substrate comprises one or more layers (e.g., 3, 5), of data. The first layer 3, generally called layer zero (or L0), is closest to the side of the disk from which the data is read (surface 7). The second layer 5, generally called layer 1 (L1), is further from the readout surface 7. Disposed between L0 (3) and L1 (5) are typically an adhesive 9 and optionally a protective coating or separating layer 11. Single sided DVD's (i.e., those that will be read from a single readout surface 7 disposed on one side of the DVD), can additionally comprise a label 13 disposed on the side of the DVD opposite the readout surface 7.

Figure 3:
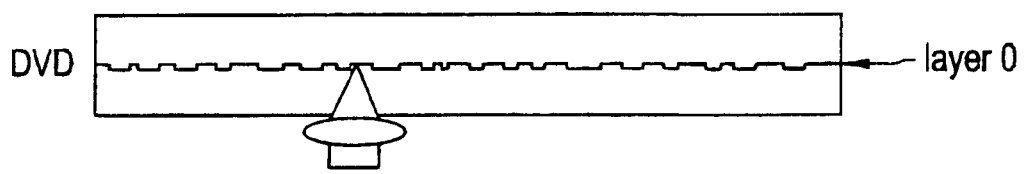
FIG. 3 is a schematic of a DVD construction having a single reflective data layer disposed within the substrate.
Figure 4:
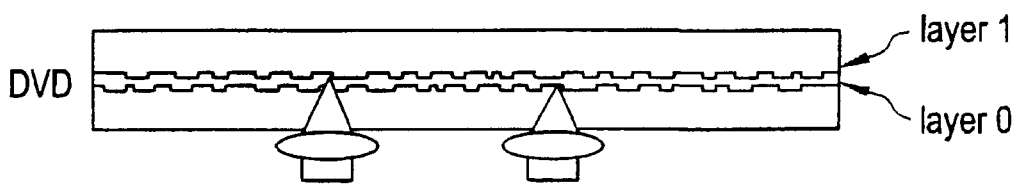
FIG. 4 is a schematic of a DVD construction having two reflective data layers, a semi-reflective data layer and a fully reflective data layer, disposed within the substrate.
Figure 2:
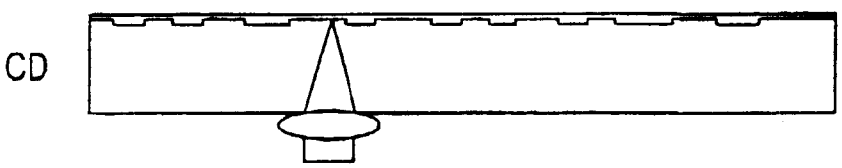
FIG. 2 is a schematic of a CD construction having a single reflective layer disposed at a second side of the substrate.

In the case of a single layer read from a readout surface 7 (e.g. DVD 5, DVD 10), a stamped surface is covered with a thin reflective data layer by a sputtering or other deposition process. This creates a metallic coating typically about 60 to about 100 angstroms (Å) thick. (See FIGS. 3, 5, and 6) For two data layer DVDs that are read from the same readout surface 7 (e.g. DVD 9, DVD 14, DVD 18), the laser must be able to reflect from the first layer 3 when reading it, but also focus (or transmit) through the first layer 3 when reading the second layer 5. (See FIGS. 4, 7, 8, and 9; DVD 9, DVD 9, DVD 14, DVD 18, respectively) Therefore, the first layer 3 is "semi-transparent" (i.e., semi-reflective), while the second layer 5 is "fully-reflective". Under current standards set by the Consortium for Optical Media, metallization combination for the fully-reflective and semi-reflective data layers, as measured per the electrical parameter R14H (as described in ECMA specifications #267), should be about 18 percent (%) to about 30% at the wavelength of the laser. In the present DVD's, the laser wavelength generally employed is less than or equal to about 700 nm, with about 400 nm to about 675 nm preferred, and about 600 nm to about 675 nm more preferred. Although these metallization standards were set for DVD data layers employed with colorless, optical quality resin, they are equally applied to DVD systems with colored resin.

When color is added to the resin, light transmission through and reflected from the substrate is effected. The metallization nature and thickness on the semi-reflective and fully reflective (L0 (3) and L1 (5)) layers is adapted for the light transmission of the substrate. Desired reflectivity can be obtained by balancing the metallization thickness with the reflectivity of the semi-reflective data layer 3, and by adjusting the thickness of the fully reflective data layer 5 to ensure its reflectivity is within the desired specification.

Metallization for the individual data layer(s) can be obtained using various reflective materials. Materials, e.g., metals, alloys, and the like, having sufficient reflectivity to be employed as the semi-reflective and/or fully reflective data layers, and which can preferably be sputtered onto the substrate, can be employed. Some possible reflective materials comprise gold, silver, platinum, silicon, aluminum, and the like, as well as alloys and combinations comprising at least one of the foregoing materials. For example, the first/second reflective data layer metallization can be gold/aluminum, silver alloy/aluminum, silver alloy/silver alloy, or the like.

In addition to the overall reflectivity of each layer 3,5, the difference in reflectivity between subsequent reflective data layers (e.g., layers 3,5) should be controlled, in order to ensure sufficient reflectivity of the subsequent layer. Preferably, the difference in reflectivity between subsequent layers (e.g., the first and second layers 3,5) is less than or equal to about 5%, with less than or equal to about 4% preferred, and less than or equal to about 3.0% more preferred. It is further preferred to have a reflectivity difference between the adjacent reflective data layers 3,5, of greater than or equal to about 0.5%, with greater than or equal to about 1% more preferred. It should be noted that although described in relation to two layers, it is understood that more than two layers could be employed, and that the difference in reflectivity between subsequent layers should be as set forth above.

The reflective data layers are typically sputtered or otherwise disposed on a pattern (e.g., surface features such as pits, grooves, asperities, start/stop orientor, and/or the like) formed into a surface of the substrate via molding, embossing, or the like. Depositions, for example, can comprise sputtering a semi-reflective data layer over a first patterned surface. A separator layer or protective coating can then be disposed over the semi-reflective data layer. If a multiple data layer DVD (e.g., DVD 14, DVD 18, or the like) is to be formed, a $2^{nd}$ patterned surface can be formed (e.g., stamped or the like) in the side of the separator layer opposite the semi-reflective data layer. A fully reflective data layer can then be sputtered or otherwise deposited on the separator layer. Alternatively, for DVD 14 construction, the fully reflective data layer can be deposited on a patterned surface of a $2^{nd}$ substrate (or resin layer). A separate layer or protective coating is then disposed on one or both of the semi-reflective data layer and the fully reflective data layer. A bonding agent or adhesive can then be disposed between the 2 substrates and they can be bonded together to form a disk as illustrated in FIGS. 3–9. Optionally, several semi-reflective data layers can be deposited with a separator layer between each subsequent layer.

The reflectivity of the reflective data layer(s) can be about 5% to about 100%, depending upon the number of reflective layers. If a single reflective data layer is employed, the reflectivity is preferably about 30% to about 100%, with about 35% to about 90% more preferred, and about 45% to about 85% even more preferred. If a dual reflective data layer is employed, the reflectivity of the data layers is preferably about 5% to about 45%, with about 10% to about 40% more preferred, about 15% to about 35% even more preferred, and about 18% to about 30% especially preferred. Finally, if multiple reflective data layers (e.g., greater than 2 reflective data layers readable from a single reading surface) are employed, the reflectivity is preferably about 5% to about 30%, with about 5% to about 25% more preferred. The especially preferred ranges are currently based upon the ECMA specification #267, wherein the reflectivity is either about 1 8% to about 30% reflectivity for a dual layered DVD (e.g., at least one fully reflective layer and at least one semi-reflective layer) or about 45% to about 85% reflectivity for a single layer DVD (e.g., one fully reflective layer).

The substrate can comprise any optical quality plastic, e.g., any plastic that enables the transmission of about 60% to less than 94% of light therethrough, in the wavelength region of the laser. Within that transmission range, preferably, the transmissivity is greater than or equal to about 70%, with greater than or equal to about 74% more preferred, and greater than or equal to about 78% especially preferred. Depending upon the type and amount of colorant employed, the transmissivity can be less than or equal to about 92%, with less than or equal to about 88% and even less than or equal to about 85% possible, depending upon the type of colorant. It should be noted that as the transmissivity of the colored substrate decreases, the ability to attain the desired adhesion of the substrates becomes more difficult.

The plastic substrate can comprise a resin such as an amorphous, crystalline, or semi-crystalline thermoplastic, a thermoset, or a combination comprising at least one of the foregoing plastics. Some possible plastics include polyetherimides, polyetheretherketones, polyimides, polyvinyl chloride, polyolefins (including, but not limited to, linear and cyclic polyolefins and including polyethylene, chlorinated polyethylene, polypropylene, and the like), polyesters (including, but not limited to, polyethylene terephthalate, polybutylene terephthalate, polycyclohexylmethylene terephthalate, and the like), polyamides, polysulfones (including, but not limited to, polyethersulfones, polyetherethersulfones, hydrogenated polysulfones, and the like), polyimides, polyether imides, polyether sulfones, polyphenylene sulfides, polyether ketones, polyether ether ketones, ABS resins, polystyrenes (including, but not limited to, hydrogenated polystyrenes, syndiotactic and atactic polystyrenes, polycyclohexyl ethylene, styrene-co-acrylonitrile, styrene-co-maleic anhydride, and the like), polybutadiene, polyacrylates (including, but not limited to, polymethylmethacrylate, methyl methacrylate-polyimide copolymers, and the like), polyacrylonitrile, polyacetals, polycarbonates, polyphenylene ethers (including, but not limited to, those derived from 2,6-dimethylphenol and copolymers with 2,3,6-trimethylphenol, and the like), ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, tetrafluoroethylene fluorocarbon copolymers (e.g., Teflons), epoxy, phenolic, alkyds, polyester, polyimide, polyurethane, polysiloxanes, polysilanes, bis-maleimides, cyanate esters, vinyl, and benzocyclobutene resins, in addition to blends, copolymers, mixtures, reaction products and composites comprising at least one of the foregoing plastics. Preferably, the substrate comprises polycarbonate, with a primarily polycarbonate (e.g., greater than or equal to about 80% polycarbonate) substrate especially preferred.

As used herein, the terms "polycarbonate", "polycarbonate composition", and "composition comprising aromatic carbonate chain units" includes compositions having structural units of the formula (I):

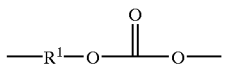
(I)

in which at least about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula (II):

$$—A^1—Y^1—A^2—$$ (II)

wherein each of $A^1$ and $A^2$ is a monocyclic divalent aryl radical and $Y^1$ is a bridging radical having one or two atoms which separate $A^1$ from $A^2$. In an exemplary embodiment, one atom separates $A^1$ from $A^2$. Illustrative, non-limiting examples of radicals of this type are —O—, —S—, —S(O)—, —S(O$_2$)—, —S(O)—, methylene, cyclohexyl-methylene, 2-[2,2,1]-bicycloheptylidene, ethylidene, isopropylidene, neopentylidene, cyclohexylidene, cyclopentadecylidene, cyclododecylidene, and adamantylidene. The bridging radical $Y^1$ can be a hydrocarbon group or a saturated hydrocarbon group such as methylene, cyclohexylidene or isopropylidene.

Polycarbonates can be produced by the interfacial reaction of dihydroxy compounds in which only one atom separates $A^1$ and $A^2$. As used herein, the term "dihydroxy compound" includes, for example, bisphenol compounds having general formula (III) as follows:

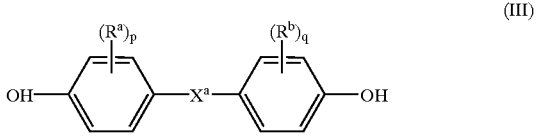
(III)

wherein $R^a$ and $R^b$ each represent a halogen atom or a monovalent hydrocarbon group and may be the same or different; p and q are each independently integers from 0 to 4; and $X^a$ represents one of the groups of formula (IV):

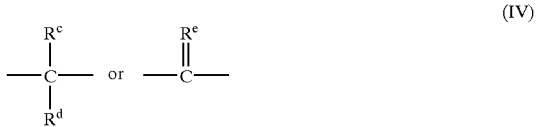
(IV)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include dihydric phenols and the dihydroxy-substituted aromatic hydrocarbons disclosed by name or formula (generic or specific) in U.S. Pat. No. 4,217,438. A nonexclusive list of specific examples of the types of bisphenol compounds that may be represented by formula (III) includes the following: 1,1-bis(4-hydroxyphenyl) methane; 1,1-bis(4-hydroxyphenyl) ethane; 2,2-bis(4-hydroxyphenyl) propane (hereinafter "bisphenol A" or "BPA"); 2,2-bis(4-hydroxyphenyl) butane; 2,2-bis(4-hydroxyphenyl) octane; 1,1-bis (4-hydroxyphenyl) propane; 1,1-bis(4-hydroxyphenyl) n-butane; bis(4-hydroxyphenyl) phenylmethane; 2,2-bis(4-hydroxy-1-methylphenyl) propane; ,1-bis (4-hydroxy-t-butylphenyl) propane; bis (hydroxyaryl) alkanes such as 2,2-bis(4-hydroxy-3-bromophenyl) propane; 1,1-bis(4-hydroxyphenyl) cyclopentane; and bis (hydroxyaryl) cycloalkanes such as 1,1-bis(4-hydroxyphenyl) cyclohexane; and the like, as well as combinations comprising at least one of the foregoing compounds.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have from 2 to about 40 carbons. A preferred aliphatic diacid is dodecandioic acid. Polyarylates and polyester-carbonate resins or their blends can also be employed. Branched polycarbonates are also useful, as well as blends of linear polycarbonate and a branched polycarbonate. The branched polycarbonates may be prepared by adding a branching agent during polymerization.

These branching agents may comprise polyfunctional organic compounds containing at least three functional groups that may be hydroxyl, carboxyl, carboxylic anhydride, haloformyl, and mixtures comprising at least one of the foregoing groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid and benzophenone tetracarboxylic acid, and the like. The branching agents may be added at a level of about 0.05 to about 2.0 weight percent, based upon the total weight of the resin. Branching agents and procedures for making branched polycarbonates are described in U.S. Pat. Nos. 3,635,895 and 4,001,184. All types of polycarbonate end groups are herein contemplated.

Preferred polycarbonates are based on bisphenol A, in which each of $A^1$ and $A^2$ is p-phenylene and $Y^1$ is isopropylidene. Preferably, the weight average molecular weight of the polycarbonate is about 5,000 to about 100,000, more preferably about 10,000 to about 65,000, and most preferably about 15,000 to about 35,000.

In monitoring and evaluating polycarbonate synthesis, it is of particular interest to determine the concentration of Fries product present in the polycarbonate. As noted, the generation of significant Fries product can lead to polymer branching, resulting in uncontrollable melt behavior. As used herein, the terms "Fries" and "Fries product" denote a repeating unit in polycarbonate having the formula (V):

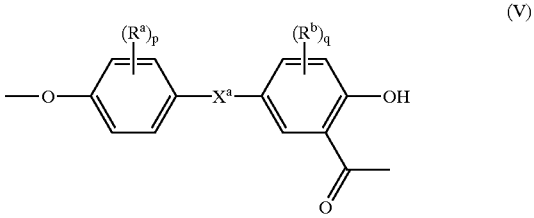
(V)

wherein $X^a$ is a bivalent radical as described in connection with formula (III) described above.

The polycarbonate composition may also include various additives ordinarily incorporated in resin compositions of this type. Such additives are, for example, fillers or reinforcing agents; heat stabilizers; antioxidants; light stabilizers; plasticizers; antistatic agents; mold releasing agents; additional resins; blowing agents; and the like, as well as combinations comprising at least one of the foregoing additives. Examples of fillers or reinforcing agents include glass fibers, asbestos, carbon fibers, silica, talc and calcium carbonate. Examples of heat stabilizers include triphenyl phosphite, tris-(2,6-dimethylphenyl)phosphite, tris-(mixed mono-and di-nonylphenyl)phosphite, dimethylbenzene phosphonate, and trimethyl phosphate. Examples of antioxidants include octadecyl-3-(3,5-di-tert-butyl-4-hydroxyphenyl) propionate, and pentaerythrityl-tetrakis[3-(3,5-di-tert-butyl-4-hydroxyphenyl) propionate]. Examples of light stabilizers include 2-(2-hydroxy-5-methylphenyl) benzotriazole, 2-(2-hydroxy-5-tert-octylphenyl)-benzotriazole and 2-hydroxy-4-n-octoxy benzophenone. Examples of plasticizers include dioctyl-4,5-epoxy-hexahydrophthalate, tris-(octoxycarbonylethyl) isocyanurate, tristearin and epoxidized soybean oil. Examples of the antistatic agent include glycerol monostearate, sodium stearyl sulfonate, and sodium dodecylbenzenesulfonate. Examples of mold releasing agents include stearyl stearate, beeswax, montan wax and paraffin wax. Examples of other resins include but are not limited to polypropylene, polystyrene, polymethyl methacrylate, and polyphenylene oxide. Combinations of any of the foregoing additives may be used. Such additives may be mixed at a suitable time during the mixing of the components for forming the composition.

In addition to the polymer and coloring material, the composition may optionally include various additives ordinarily incorporated in resin compositions of this type.

Such additives may include UV absorbers; stabilizers, such as light and thermal stabilizers (e.g., acidic phosphorous-based compounds); hindered phenols; zinc oxide, zinc sulfide particles, or combination thereof; lubricants (mineral oil, and the like); plasticizers; antioxidants; anti-static agents (tetra alkylammonium benzene sulfonate salts, tetra alkylphosphonium benzene sulfonate salts, and the like); mold releasing agents (pentaerythritol tetrastearate; glycerol monstearate, and the like); and the like, and combinations comprising at least one of the foregoing additives. For example, the substrate can comprise about 0.01 weight percent wt % to about 0.1 wt % heat stabilizer; about 0.01 wt % to about 0.2 wt % antistatic agent; and about 0.1 wt % to about 1 wt % mold releasing agent; based upon the total weight of the polymer.

Some possible antioxidants include, for example, organophosphites, e.g., tris (nonyl-phenyl)phosphite, tris(2, 4-di-t-butylphenyl)phosphite, bis(2,4-di-t-butylphenyl) pentaerythritol diphosphite, distearyl pentaerythritol diphosphite and the like; alkylated monophenols, polyphenols and alkylated reaction products of polyphenols with dienes, such as, for example, tetrakis[methylene(3,5-di-tert-butyl-4-hydroxyhydrocinnamate)] methane, 3,5-di-tert-butyl-4-hydroxyhydrocinnamate octadecyl, 2,4-di-tert-butylphenyl phosphite, and the like; butylated reaction products of para-cresol and dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds, such as, for example, distearylthiopropionate, dilaurylthiopropionate, ditridecylthiodipropionate, and the like; amides of beta-(3,5-di-tert-butyl-4-hydroxyphenyl)-propionic acid; and the like, as well as combinations comprising at least one of the foregoing antioxidants.

In order to aid in the processing of the polymer, particularly polycarbonate, catalyst(s) may also be employed, namely in the extruder or other mixing device. The catalyst typically assists in controlling the viscosity of the resulting material. Possible catalysts include hydroxides, such as tetraalkylammonium hydroxide, tetraalkylphosphonium hydroxide, and the like, with diethyidimethylammonium hydroxide and tetrabutylphosphonium hydroxide preferred. The catalyst(s) can be employed alone or in combination with quenchers such as acids, such as phosphoric acid, and the like. Additionally, water may be injected into the polymer melt during compounding and removed as water vapor through a vent to remove residual volatile compounds.

The polymer is produced by using a reaction vessel capable of adequately mixing various precursors, such as a single or twin screw extruder, kneader, blender, or the like. The polymer is then formed, via a molding, extrusion, rolling, stamping, or similar techniques, into a substrate.

Adjacent substrates are attached together with an adhesive or bonding agent (e.g., separator or bonding layer). Any bonding agent having the desired optical qualities can be employed. Some possible bonding agents include glue (e.g., hot glue), acrylic resin (e.g., ultra-violet (UV) curable acrylic resin, with transparent (i.e., greater than or equal to UV curable acrylic resin preferred), and the like, as well as combinations comprising at least one of the foregoing bonding agents.

As with the bonding agent, the separating layer can comprise a transparent material. Some possible separating layers include UV curable transparent resins. Typically, the separating (bonding) layer is up to or exceeding several hundreds of micrometers ($\mu$m) thick, with a thickness of less than or equal to about 100 $\mu$m useful, and a thickness of about 40 $\mu$m to about 70 $\mu$m typically employed with current DVD formats.

The color can be added to the DVD by incorporating colorant into the substrate (e.g., the resin layer), the separator layer(s), a top coat, or any combination comprising at least one of the foregoing layers. The coloring of the disk can be obtained in several ways, e.g., using a pre-colored resin for the substrate(s) and/or separating layer(s), mixing a colorless resin and a color concentrate at the molding machine, and using liquid or powder coloring (or a combination comprising at least one of these methods). Whether the colorants are introduced by feeding during the extrusion process, by physical mixing of colorless pellets with a color concentrate before molding, or by liquid or powder coloring at the molding machine, the colorant and its concentration are chosen to meet the DVD specifications. Even when colorant is employed, transparency of the substrate (e.g., greater than or equal to about 60% transparency at the reading wavelength) is maintained in order to attain a bootable DVD.

Transparency of the substrate is directly related to the amount of scattering particles present in the substrate and their size. If they are significantly smaller than the visible wavelength, scattering will not be noticeable. Since the colorants can be a major source of scattering particles, the colorant is preferably filtered, with melt filtering especially preferred, e.g., during adding in the extrusion process. Preferably, the size of the filtered colorant particles (and aggregates thereof) is less than or equal to about 200 nanometers (nm), with a particle (and aggregate) size of less than or equal to about 50 nm preferred.

Colorants are also preferably selected so that they solubilize in the material used to form the layer in which the colorant is disposed. Colorants that are soluble in the materials used for DVD layers include dyes (e.g., "solvent dyes"), organic colorants, pigments, and the like, which behave like dyes; i.e., colorants that disperse in the plastic and do not form aggregates having a size greater than or equal to about 200 nm, with an aggregate size less than or equal to about 50 nm preferred. Some suitable colorants include, but are not limited to, those of the chemical family of anthraquinones, perylenes, perinones, indanthrones, quinacridones, xanthenes, oxazines, oxazolines, thioxanthenes, indigoids, thioindigoids, naphtalimides, cyanines, xanthenes, methines, lactones, coumarins, bis-benzoxaxolylthiophenes (BBOT), napthalenetetracarboxylic derivatives, monoazo and disazo pigments, triarylmethanes, aminoketones, bis(styryl)biphenyl derivatives, and the like, as well as combinations comprising at least one of the foregoing colorants.

Factors in determining the plastic/colorant combination and the amount of colorant employed are currently based upon the above mentioned. DVD specifications (EMCA Specifications #267). In order to obtain a semi-reflective data layer and a fully reflective data layer reflectivity within specifications (about 18% to about 30%) for a colored multi-layered DVD, the light transmission and colorant concentration are balanced. The light transmission through the substrate (i.e., DVD half) at the DVD readback laser wavelength is preferably greater than or equal to about 60%. The colorant loading, as well as colorant nature (e.g., the shape of the spectral transmission curve), are dependent on the target color and light transmissivity.

Figure 10:
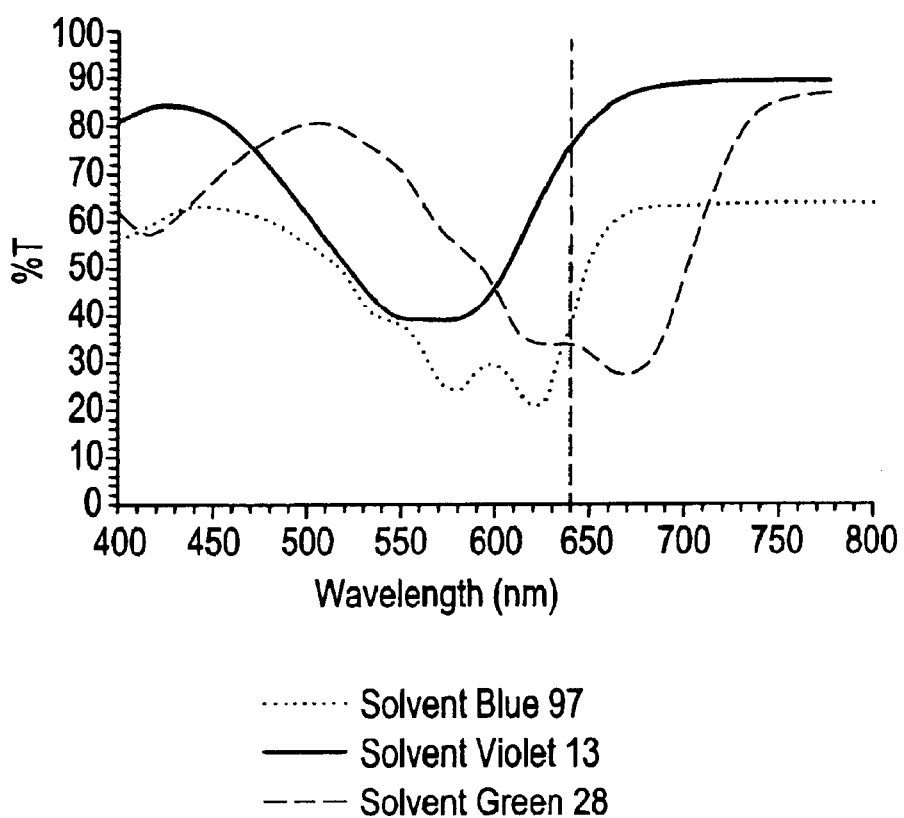
FIG. 10 is a graphical illustration of light transmission of several colorants in 1.2 mm polycarbonate substrate at a loading of 0.014 weight percent.

FIG. 10 illustrates the different light transmission of some common plastic colorants (Solvent Violet 13, Solvent Blue 97 and Solvent Green 28). The colorant that has the lower absorptivity at the desired wavelength, e.g., at 650 nm, therefore exhibits the maximum transmission at this wavelength and is preferred. Selection of colorants with high absorptivity at the desired wavelength limits the maximum colorant loading possible to yield a functional multi-layered DVD. Since colorants with a lower absorptivity at the desired wavelength can be used at higher loadings in the formulation it becomes easier to obtain the target color in,a functional disk. For instance, Solvent Violet 13 is preferred over Solvent Blue 97 when trying to achieve a blue color because of its lower absorptivity at 650 nm.

Typically, the colorant loading is greater than or equal to about 0.01 weight percent (wt %), with greater than or equal to about 0.02 wt % preferred, greater than or equal to about 0.04 wt % more preferred, greater than or equal to about 0.4 wt % even more preferred, and greater than or equal to about 0.5 wt % most preferred, based upon the total weight of the substrate comprising the colorant. It is further preferred to employ colorant in an amount of less than or equal to about 3.0 wt %, with less than or equal to about 2.0 wt % more preferred, less than or equal to about 1.0 wt % even more preferred, and less than or equal to about 0.75 wt % especially preferred.

In addition to the reflective layers and separator layer(s), layers such as protective layer(s) (e.g., lacquers, and the like), ultra-violet (UV) inhibitor layer(s), moisture barrier layer(s), ductility layer(s), and the like, as well as combinations comprising at least one of these layers, can be employed.

The disclosure is further illustrated by the following non-limiting examples.

EXAMPLES

The following example compares bonding capability of five colored and a clear DVD in relation to the total energy transmitted through the substrate in the UV range. Table 1 lists the details of the formulations used. All six formulations were blended and pelletized in a single screw extruder at 290° C. DVDs were molded from the pelletized material using standard procedure and the discs were subjected to complete electrical (AudioDev DVDPro SA300 Pulsetech Drive) and mechanical (Dr. Schenk PROmeteus MT136) testing.

[t1]

TABLE 1

| Formulation | Samples (amount in parts by weight) | | | | | |
| --- | --- | --- | --- | --- | --- | --- |
|  | A | B | C | D | E[1] | F |
| Polycarbonate resin | 100 | 100 | 100 | 100 | 100 | 100 |
| Glycerol monostearate | 0.03 | 0.03 | 0.03 | 0.03 | 0.03 | 0.03 |
| Bis(2,4-dicumylphenyl) pentaerythritol diphosphite | 0.02 | 0.02 | 0.02 | 0.02 | 0.02 | 0.02 |
| Solvent red 52/macrolex red 5B |  | 0.15 | 0.2 | 0.3 |  |  |
| Solvent Red 207/rosaplast red 601 |  |  |  |  |  | 0.4 |
| Solvent Yellow 93/macrolex yellow 3G | 0.05 | 0.15 | 0.1 |  |  |  |
| Solvent Violet 36/macrolex violet 3R |  |  |  |  |  | 0.01 |

[1]clear

During the molding process, it is seen that the bonding layer fails to cure completely in case of formulations B and C only. This poor bonding/adhesion of the two plastic substrates manifests in radial and tangential tilts being out of specification. Measurement of the mechanical parameters indicate that the tangential tilts on all formulations is within specification, however, as expected, radial tilt measurements are out of specification for formulations B and C only. (See Table 2)

[t2]

TABLE 2

| Radial Tilt and Transmission Data for Discs | | | | |
| --- | --- | --- | --- | --- |
| Sample | Mininum Rad[1] In mdeg | Maximum Rad[1] Out mdeg[2] | Average Rad[1] Tilt mdeg | % Transmission[2] |
| A | −465 | 195 | −3.5 | 86.67 |
| B | −1717 | −1567 | −1743 | 83.87 |
| C | −1808 | −1845 | −1467 | 83.42 |
| D | −382 | −157 | −364 | 81.96 |
| E | −290 | −185 | −235 | 87.17 |
| F | 101 | 262 | 223 | 82.8 |

[1]± 800 mdeg
[2]at the laser wavelength

Figure 11:
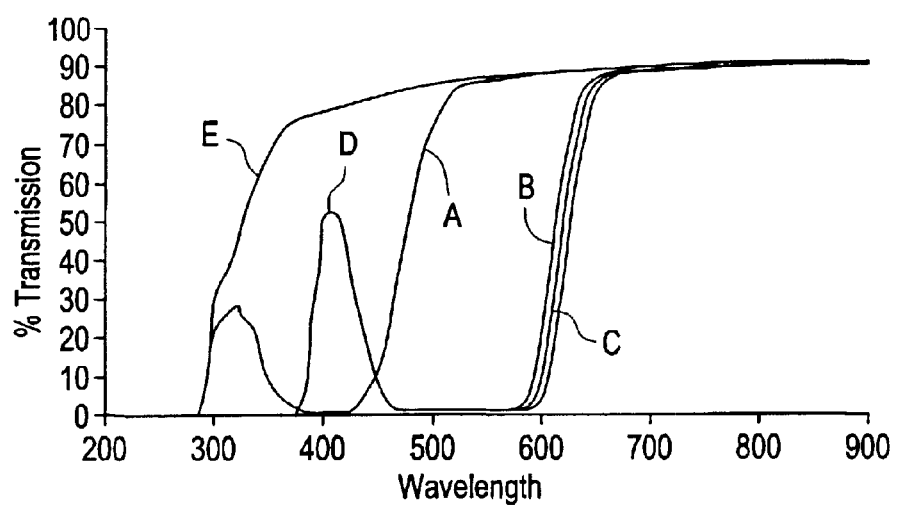
FIG. 11 is a graphical illustration of transmission curves of experimental formulations.
Figure 12:
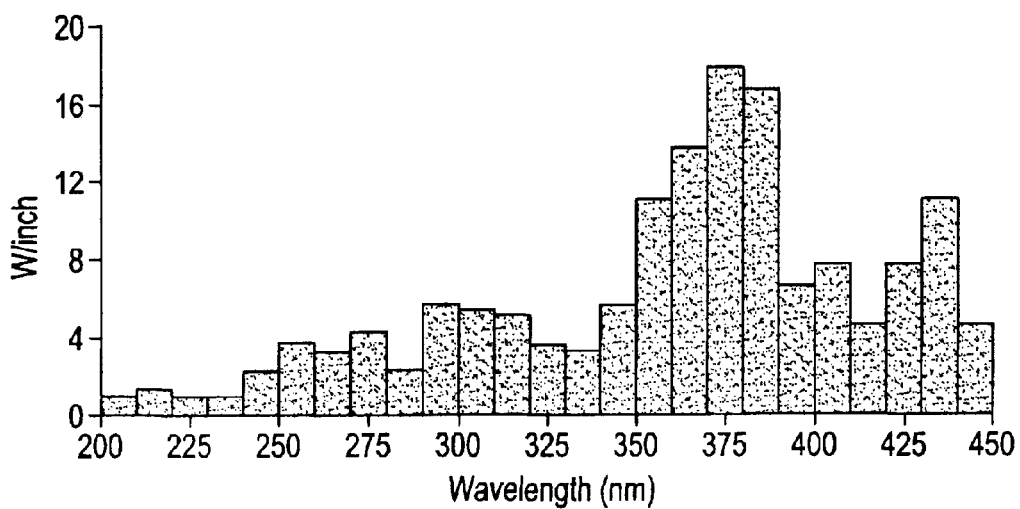
FIG. 12 are graphical illustrations of a spectral distribution of type "D" electrodeless bulb from fusion UV systems.
Figure 13:
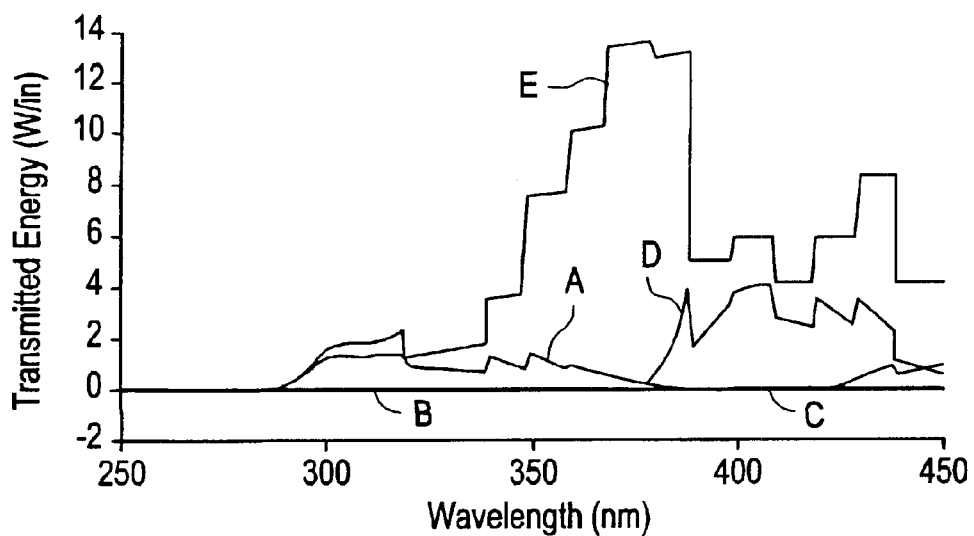
FIG. 13 is a graphical representation of a percentage of incident energy transmitted through substrates of experimental formulations.

The transmission curves of formulations A through E across the UV-visible region measured on Hewlett Packard Spectrophotometer Model 8453 (UV-VIS-MIR Spectrophotometer) are shown in FIG. 11. These curves can be used to estimate the energy transmitted through the substrate at any wavelength if the spectral distribution of the irradiating source is known. For illustrative purposes, the radiation distribution of a type "D" bulb from Fusion UV systems (FIG. 12) to obtain a distribution of the percentage of the incident energy that is transmitted through each of the substrates (FIG. 13).

The total energy passing through the substrate about 330 to about 410 nanometers (nm) (obtained by an integration procedure) expressed as a fraction of energy transmitted through the clear substrate is tabulated below in Table 3. Table 3 is a comparison of total energy transmitted through disc substrates in the wavelength range of about 330 to about 410 nm, expressed as a function of percent energy transmitted through clear substrate. In other words, the UV Bonding Index is tabulated below in Table 3. In Table 3, it is clearly seen that formulations B and C transmit only 0.045% of the incident energy which, being below the threshhold level, leads to poor bonding. On the other hand, formulations A, D and F have been developed to transmit 5.6%, 13.1% and 49% of the energy, respectively, which, being above the threshhold of 1%, provides good bonding capability.

TABLE 3

| Sample | Ratio of energy transmitted through colored substrate to energy transmitted through clear substrate (%) (UV Bonding Index) |
| --- | --- |
| A | 5.6 |
| B | 0.044 |
| C | 0.046 |
| D | 13.1 |
| E | 100 |
| F | 49 |

Figure 14:
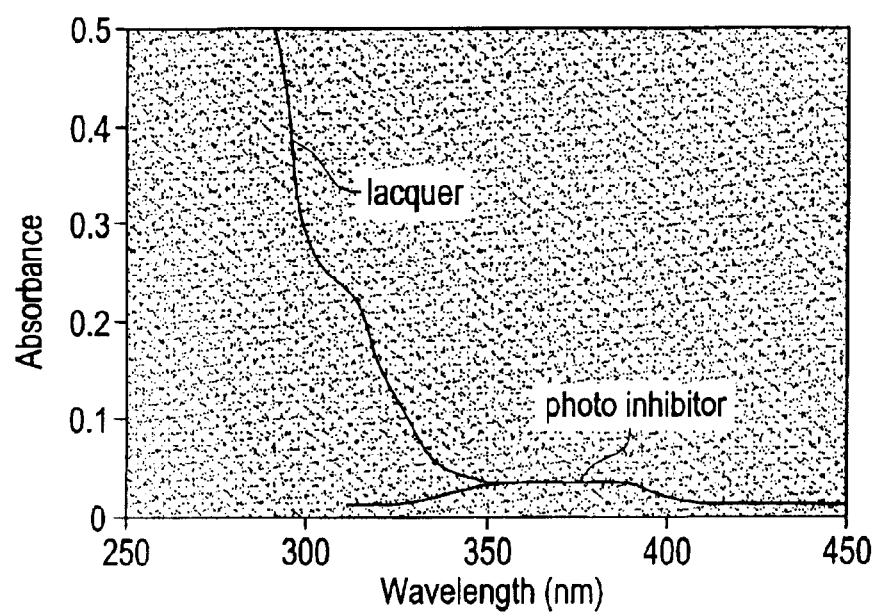
FIG. 14 is a graphical representation of the absorption spectrum of Daicure Clear SD-698 lacquer.

Furthermore, when the absorption profile of the photoinitiator in the bonding layer is known, the total energy absorbed by the initiator can also be calculated by integrating the product of the energy transmitted through the substrate and the absorbance of the initiator. FIG. 14 shows the absorption spectrum of Daicure clear SD-698, measured in 0.1 wt % methanol solution (Shimadzu Spectrophotometer commercially available from Shimadzu, Japan), an acrylic lacquer used in DVD bonding. The total energy absorbed by the photoinitiator for each of the substrates A–F expressed as a percentage of the clear is tabulated below (Table 4).

TABLE 4

| Sample | Total energy absorbed by the photoinitiator expressed as a percentage of absorbance in a clear substrate |
| --- | --- |
| A | 4 |
| B | 0.042 |
| C | 0.045 |
| D | 11.3 |
| E | 100 |
| F | 49.9 |

By controlling the percentage of absorbance of a colored substrate employed in a storage media that uses an adhesive, e.g., a DVD, robust formulations for colored DVDs having good bonding capability in addition to good electrical/mechanical properties can be developed. The amount of absorbance of the photoinitiator exceeds about 1% to obtain an operable disc. Consequently, the absorbance of the photoinitiator can be determined. A parameter of the colorant can then be adjusted to attain a UV Bonding Index of greater than or equal to about 0.05. Possible colorant parameters include colorant concentration, colorant type, as well as combinations comprising at least one of the foregoing parameters. It should be noted that even for similar colors, namely Samples B, C, and F (i.e., similar colors to the eye), vastly different UV Bonding Indices are obtained, with B and C having poor bonding and F having good bonding. It should further be noted that the good bonding is obtained even though the % transmission at the laser wavelength for F is less than that for B and C.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for making an optical disc, comprising:
   forming a first plastic substrate comprising greater than or equal to about 0.01 wt % colorant, based upon the total weight of the first plastic substrate, wherein a UV Bonding Index of the first plastic substrate is controlled to be greater than or equal to about 0.5;
   disposing a data layer between the first plastic substrate and a second substrate;
   bonding the first plastic substrate to the second plastic substrate with a bonding layer; and
   curing the bonding layer.

2. A method for making an optical disc according to claim 1, wherein light transmission through the first plastic substrate, at a laser reading wavelength, is about 60% to less than 94%.

3. A method for making an optical disc according to claim 2, wherein the light transmission is about 70% to about 92%.

4. A method for making an optical disc according to claim 3, wherein the light transmission is about 74% to about 88%.

5. A method for making an optical disc according to claim 4, wherein the light transmission is about 78% to about 84%.

6. A method for making an optical disc as described in claim 1, wherein the UV Bonding Index is less than or equal to about 70.

7. A method for making an optical disc as described in claim 6, wherein the UV Bonding Index is less than or equal to about 60.

8. A method for making an optical disc as described in claim 7, wherein the UV Bonding Index is less than or equal to about 50.

9. A method for making an optical disc as described in claim 8, wherein the UV Bonding Index is less than or equal to about 40.

10. A method for making an optical disc as described in claim 9, wherein the UV Bonding Index is less than or equal to about 30.

11. A method for making an optical disc as described in claim 10, wherein the UV Bonding Index is less than or equal to about 20.

12. A method for making an optical disc as described in claim 11, wherein the UV Bonding Index is less than or equal to about 10.

13. A method for making an optical disc according to claim 1, wherein the first plastic substrate comprises greater than or equal to about 0.02 wt % of the colorant, based upon the total weight of the first plastic substrate.

14. A method for making an optical disc according to claim 13, wherein the first plastic substrate comprises greater than or equal to about 0.04 wt % of the colorant, based upon the total weight of the first plastic substrate.

15. A method for making an optical disc according to claim 1, further comprising forming plastic material from a plastic resin and colorant, wherein the plastic material comprises greater than or equal to about 0.01 wt % colorant, based upon the total weight of the plastic material, and wherein the plastic material has the same colorant concentration as the first plastic substrate; and forming the first plastic substrate from the plastic material.

16. A method for making an optical disc according to claim 1, further comprising forming the first plastic substrate from a plastic resin, wherein the plastic resin comprises a different colorant concentration than the first plastic substrate.

17. A method for making an optical disc according to claim 1, further comprising determining an absorbance of a photoinitiator in the bonding layer, and adjusting a parameter of the colorant to attain a UV Bonding Index of greater than or equal to about 0.05, wherein the parameter is selected from the group consisting of colorant concentration, colorant type, as well as combinations comprising at least one of the foregoing parameters.

18. A method for making an optical disc, comprising:
forming plastic material from a plastic resin and colorant, wherein the plastic material comprises greater than or equal to about 0.01 wt % colorant, based upon the total weight of the plastic material;
forming the first plastic substrate from the plastic material, wherein the first plastic substrate has a UV Bonding Index of greater than or equal to about 0.5, and wherein the plastic material has the same colorant concentration as the first plastic substrate;
disposing a data layer between the first plastic substrate and a second substrate;
bonding the first plastic substrate to the second plastic substrate with a bonding layer; and
curing the bonding layer.

19. A method for making an optical disc as described in claim 18, wherein the UV Bonding Index is less than or equal to about 40.

20. A method for making an optical disc as described in claim 19, wherein the UV Bonding Index is less than or equal to about 30.

21. A method for making an optical disc as described in claim 20, wherein the UV Bonding Index is less than or equal to about 20.

22. A method for making an optical disc as described in claim 21, wherein the UV Bonding Index is less than or equal to about 10.

23. An optical disc, comprising:
at least two plastic substrates comprising a bonding layer and a data layer disposed therebetween, wherein at least one of the substrates is a read side substrate comprising greater than or equal to about 0.01 wt % colorant, based upon the total weight of the read side substrate, and wherein the read side substrate has a UV Bonding Index of greater than or equal to about 0.5.

24. An optical disc according to claim 23, wherein the optical disc is selected from the group consisting of DVD5, DVD9, DVD10, DVD14, and DVD18.

25. An optical disc according to claim 23, wherein light transmission through the read side substrate at a laser reading wavelength is about 60% to less than 94%.

26. An optical disc according to claim 25, wherein the light transmission is about 70% to about 92%.

27. An optical disc according to claim 26, wherein the light transmission is about 74% to about 88%.

28. An optical disc according to claim 27, wherein the light transmission is about 78% to about 84%.

29. An optical disc as described in claim 23, wherein the read side substrate has a thickness of about 0.4 mm to about 1 mm.

30. An optical disc as described in claim 23, wherein the UV Bonding Index is less than or equal to about 70.

31. An optical disc as described in claim 30, wherein the UV Bonding Index is less than or equal to about 60.

32. An optical disc as described in claim 31, wherein the UV Bonding Index is less than or equal to about 50.

33. An optical disc as described in claim 32, wherein the UV Bonding Index is less than or equal to about 40.

34. An optical disc as described in claim 33, wherein the UV Bonding Index is less than or equal to about 30.

35. An optical disc as described in claim 34, wherein the UV Bonding Index is less than or equal to about 20.

36. An optical disc as described in claim 35, wherein the UV Bonding Index is less than or equal to about 40.

37. An optical disc according to claim 23, wherein the plastic is selected from the group consisting of amorphous thermoplastic, crystalline thermoplastic, semi-crystalline thermoplastic, thermoset, and blends, copolymers, reaction products, and composites comprising at least one of the foregoing plastics.

38. An optical disc according to claim 37, wherein the plastic is selected from the group consisting of polyetherimides, polyetheretherketones, polyimides, polyvinyl chloride, polyolefins, polyesters, polyamides, polysulfones, polyimides, polyether imides, polyether sulfones, polyphenylene sulfides, polyether ketones, polyether ether ketones, ABS resins, polystyrenes, polybutadiene, polyacrylates, polyacrylonitrile, polyacetals, polyphenylene ethers, ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, tetrafluoroethylene fluorocarbon copolymers, epoxy, phenolic, alkyds, polyester, polyimide, polyurethane, polysiloxanes, polysilanes, bis-maleimides, cyanate esters, vinyl, benzocyclobutene resins, and blends, copolymers, reaction products, and composites comprising at least one of the foregoing plastics.

39. An optical disc according to claim 23, wherein the colorant is selected from the group consisting of anthaquinones, perylenes, perinones, indanthrones, quinacridones, xanthenes, oxazines, thioxanthenes, indigoids, thioindigoids, naphthalimides, cyanines, xanthenes, methines, lactones, coumarins, bis-benzoxaxolylthiophenes (BBOT), naphthalenetetracarboxylic derivatives, monoazo and disazo pigments, triarylmethanes, aminoketones, bis(styryl) biphenyl derivatives, and reaction products and blends comprising of at least one of the foregoing colorants.

* * * * *